United States Patent Office 2,839,942
Patented June 24, 1958

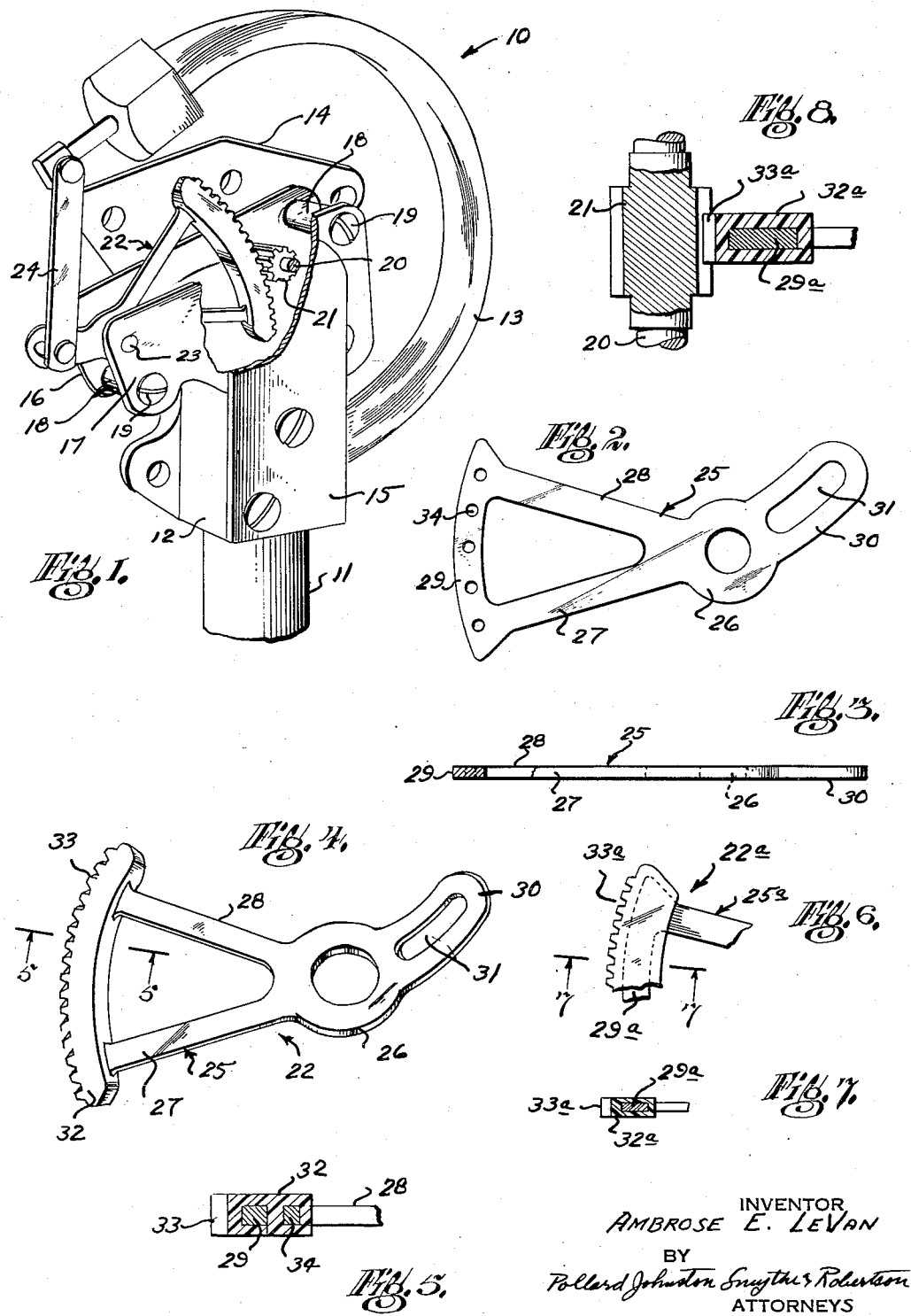

2,839,942
INSTRUMENTS

Ambrose E. Le Van, Sellersville, Pa., assignor to American Machine and Metals, Inc., New York, N. Y., a corporation of Delaware Application May 25, 1955, Serial No. 511,081

1 Claim. (Cl. 74—434)

The present invention relates generally to instruments of the kind wherein changes in a sensed physical condition, for example, pressure, temperature and the like, are indicated by the angular displacement of a swingable pointer or index in relation to a suitably calibrated scale on the dial.

In such instruments, changes in the physical condition to be indicated result in relatively small or limited movements of a motor element responsive to the condition, and a mechanical movement must be employed to translate and multiply such limited movements of the motor element into relatively large angular displacements of the pointer or index so that the scale can be extended to increase the accuracy with which the indication can be read. In most dial indicating instruments, the mechanical movement for translating and multiplying the limited movements of the motor element into relatively large angular displacements of the pointer includes a pinion of relatively small pitch diameter fixed to the shaft of the pointer and meshing with a pivotally mounted sector gear which is linked to the motor element and has a relatively large pitch diameter. If the movement is not properly lubricated between the pinion and sector gear and they are both formed of metal, the metal to metal contact may produce excessive wear and play so that, eventually, the accuracy of the instrument may deteriorate.

Long-chain synthetic polymeric amides, frequently referred to by the generic name "nylon," have properties which adapt such substances for the production of non-lubricated gears, but, as is well known, polyamide resin or nylon has a relatively high thermal coefficient of expansion which would normally affect the accuracy of the indication. In prior practice it has been proposed to avoid this difficulty by forming the structure which supports meshing gears so that it compensates for the high thermal coefficient of expansion of either one or both of the gears, for example, by forming the supporting structure or frame of a material, such as, aluminum, having a thermal coefficient of expansion more nearly approximating that of nylon than does that of brass, which is usually employed in supporting structures or frames of such instruments. Such use of a material having a high thermal coefficient of expansion for the frame of an instrument of the described character is undesirable in that it reduces the stability of the frame under changing temperatures conditions and, in compensating for the errors that would otherwise arise from the high thermal coefficient of expansion of one or both of the pinion and sector gear, introduces other inaccuracies into the indication.

One of the objects of this invention is to provide a mechanical movement for a dial indicating instrument of the described character having parts arranged to provide accuracy and yet selected to obviate the need for lubricant.

In one aspect, the frame of the supporting structure can be made, for example, of brass, stainless steel, or a suitable stable metal, the movement including a pinion meshing with a sector gear, the meshing portion of the sector gear being formed of a long-chain synthetic polymeric amide, known as nylon, so that the pinion and sector gear will provide a free and accurate transmission of the movements of the sensing or motor element to the pointer for long periods of use, even in the absence of a lubricant, and the sector gear being constructed and arranged so that changing temperature conditions will not appreciably affect either the clearance between the pinion and the sector gear or the accuracy with which they transmit the movement to the pointer. The mechanical movement includes a relatively wide faced metal pinion and a sector gear made-up of a relatively thin metal blank having an arcuate portion at one end onto which an enveloping nylon body is molded, the nylon body having teeth molded or otherwise formed thereon to mesh with the pinion so that the nylon is restrained by the metal blank and cannot appreciably affect either the clearance between the teeth of the pinion and sector gear or the accuracy with which they transmit the movements of the sensing or motor element to the pointer.

In accordance with a preferred embodiment of the invention, the arcuate portion of the metal blank forming part of the sector gear has a series of openings extending therethrough so that the material of the nylon body molded on that arcuate portion flows through such openings and, when the nylon sets, serves to bond the nylon body to the metal blank.

The described mechanical movement for a dial indicating instrument is advantageous in that it permits the use of hard metals, for example, stainless steel, high nickel-chromium, iron alloys, such as "Inconel," high nickel-copper alloys, such as "Monel," beryllium-copper and the like, for the pinion so that a relatively great dissimilarity is obtained between the hardness of the pinion and the hardness of the toothed portion of the sector gear meshing with the pinion. This relatively great dissimilarity of hardness is the most desirable condition in the case of non-lubricated meshing gears, one of which is formed of nylon. Further, the described arrangement, in providing a pinion formed of a hard metal, conforms to the accepted practice in such non-lubricated meshing gears, one of which is nylon, in that the hard metal is used on the relatively high-speed member. It is also to be noted that, in accordance with the above described aspect of the invention, the nylon body molded on the thin metal blank of the sector gear may be relatively wide in the axial direction so that a relatively large contact area is provided between the pinion and sector gear thereby to decrease the pressure at the contact area and, correspondingly, to decrease the wear, particularly of the sector gear.

The above, and other objects, features and advantages of the present invention will be apparent in the following detailed description of illustrative embodiments of the invention, particularly when the description is read in connection with the accompanying drawing forming a part hereof, and wherein:

Fig. 1 is a perspective view, partly broken away, of the operating mechanism of an instrument having a mechanical movement embodying this invention;

Fig. 2 is a plan view of a metal blank forming a part of a sector gear in a mechanical movement embodying this invention;

Fig. 3 is an elevational view, partly broken away and in section, of the metal blank of Fig. 2;

Fig. 4 is a perspective view of a completed sector gear embodying this invention;

Fig. 5 is an enlarged sectional view taken along the line 5—5 of Fig. 4;

Fig. 6 is a fragmentary elevational view of a portion of a sector gear constructed in accordance with another embodiment of this invention;

Fig. 7 is a sectional view taken along the line 7—7 of Fig. 6; and

Fig. 8 is an enlarged axial sectional view of a pinion meshing with a sector gear in a mechanical movement embodying this invention.

Referring to the drawing in detail, and initially to Fig. 1 thereof, the operating mechanism of a dial indicating instrument embodying the present invention is there illustrated and generally identified by the reference numeral 10. Although the illustrated operating mechanism is for a Bourdon tube pressure gauge, it is to be understood that the present invention is applicable to dial indicating instruments of other types having different motor or sensing elements for responding to other physical conditions.

As illustrated, the operating mechanism 10 includes a pipe or nipple 11 having a threaded end (not shown) for attachment to a conduit carrying the fluid, the pressure of which is to be indicated. The nipple 11 extends into and supports a hollow block 12 to which one end of a Bourdon tube 13 is securely attached. Integral with the block 12, and extending upwardly at the front of the latter, is a rigid plate 14, while a back member 15 is removably secured, as by machine screws, to the back surface of the block 12 and extends upwardly from the latter.

Mounted between the upwardly projecting portions of the plate 14 and member 15 is a rigid frame which includes frame members 16 and 17 held in parallel, spaced apart relationship by posts or spacers 18 receiving securing screws 19. A shaft 20 is rotatably journalled in the frame members 16 and 17 and, between the latter, carries a pinion gear 21 which is either integral with the shaft or formed as a separate member and then rigidly secured to the shaft 20.

The shaft 20, at its front end, passes through the plate 14 and is adapted to carry the usual pointer or index for cooperation with a suitably calibrated scale on a dial, and the operating mechanism 10 is intended to be enclosed in the usual casing having a glass or other transparent cover over the dial, the pointer, dial and casing being omitted from Fig. 1 of the drawing in order to facilitate the viewing of the portion of the instrument embodying the present invention.

The pinion gear 21 meshes with a sector gear which is generally identified by the reference number 22. The sector gear 22 is pivotally mounted on a pin 23 extending between the frame members 16 and 17, and a link 24 pivotally connects the free end of Bourdon tube 13 to an end of the sector gear so that the latter will be rocked in response to the movements of the free end of the Bourdon tube resulting from changes in the pressure of the fluid in the tube. As can be seen from Fig. 1, the teeth on the sector gear 22 have a pitch diameter which is at least several times greater than the pitch diameter of the pinion 21 so that the mechanical movement formed by the pinion and sector gear serves to translate and multiply the limited movements of the motor element, that is, the Bourdon tube in the illustrated instrument, into relatively large angular displacements of the pointer on the shaft 20.

In accordance with the present invention, the pinion 21 is formed of a hard, corrosion and wear resistant metal, for example, stainless steel, high nickel-chromium iron alloys, such as "Inconel," high nickel-copper alloys, such as "Monel," beryllium-copper alloys, and the like, while the sector gear 22 is formed, for the most part, of the same hard metal, but has a body of a long-chain synthetic polymeric amide, that is, of nylon, molded thereon and having teeth to mesh with the pinion 21.

Referring to Fig. 4 of the drawing, it will be seen that the sector gear 22 is made up of a thin metal blank 25 formed of a hard metal, for example, stainless steel, "Inconel," "Monel," beryllium-copper alloys and the like, and including a hub 26, adapted to be mounted on the pivot pin 23, acutely angled arms or spokes 27 and 28 extending radially from one side of the hub and an arcuate portion 29 which is concentric with the hub and integral with the radially outer ends of the arms 27 and 28 (Fig. 2). An extension 30 projects from the hub 26 in a radial direction opposed to the arms 27 and 28, and has an arcuate slot 31 for adjustably receiving the pin which connects the link 24 to the sector gear. As seen in Fig. 2, the opposite ends of the arcuate portion 29 preferably project circumferentially beyond the arms 27 and 28, respectively.

The sector gear 22 is completed by a body 32 of nylon which is molded on, and completely envelopes or surrounds, the arcuate portion 29 of metal blank 25, and the radially outer curved surface of the nylon body 32 is formed with a series of teeth 33 (Fig. 4) for meshing engagement with the teeth of pinion 21. As can best be seen in Fig. 8, the nylon engages or underlies the entire bottom of the arcuate portion 29 between the arms 27 and 28 of metal blank 25 to prevent radial outward movement of the nylon body 32 relative to the arcuate metal portion 29.

Since the radial distance from the pitch circle of the teeth 33 to the concentric radially outer edge of the arcuate portion 29 of the metal blank is small in relation to the radius of that pitch circle, it is apparent that the relatively high thermal coefficient of expansion of the nylon of body 32 will have little or no effect upon the clearance between the teeth of the sector gear and pinion, even under varying temperature conditions, so that the mechanical movement can be designed for a minimum clearance between such teeth thereby to increase the accuracy of the transmission.

Further, since the arcuate portion 29 of the metal blank forms a resistant core in the nylon body 32, the expansion and contraction of the latter, particularly, circumferentially, is resisted so that the angular relationship between the sector gear and the pinion is substantially unaffected by changing temperature conditions. In order to provide an increased bond between the nylon body 32 and the arcuate portion 29, the latter is, in a preferred embodiment of the invention (Figs. 2 and 5), formed with a series of openings 34 therein so that, when the body 32 is molded on the arcuate portion of the blank 25, the nylon of the body will flow through the openings 34, as shown in Fig. 5, to lock the nylon body relative to the arcuate portion 29 at a number of circumferentially spaced locations. Since the metal of the arcuate portion 29 has a relatively low thermal coefficient of expansion, the interlocking of the material of the body 32 with the arcuate portion 29 will help prevent any substantial expansion or contraction of the body 32 in the circumferential direction.

Although the arcuate portion 29 of the blank 25 has the openings 34 therein in the above described preferred embodiment, it is to be understood that a sector gear can be produced in accordance with this invention without including such openings. Thus, as shown in Figs. 6, 7 and 8, a sector gear 22a embodying this invention, and which is generally similar to the above described sector gear 22, has a thin metal blank 25a including an arcuate portion 29a on which a nylon body 32a is molded, and teeth 33a are formed in the radially outer surface of the body 32a to mesh with the teeth of the metal pinion 21 on the shaft 20 (Fig. 8). As in the first described embodiment, the thickness of nylon between the pitch circle of the teeth 33a and the radially outer edge of the arcuate portion 29a is so small that the expansion and contraction of the nylon under changing temperature conditions cannot appreciably affect the clearance between the teeth of the pinion and sector gear. Further, since the body 32a envelopes or surrounds the arcuate portion 29a on which it is molded, thereby underlying the bottom of arcuate portion 29a between arms 27 and 28, the metal arcuate portion tends to restrict or resist expansion and contraction in the circumferential direction even though the bond between the nylon body and the metal blank is not as complete as when the arcuate portion of the latter has the openings 34 therein.

In each of the described embodiments of the invention, the teeth in the nylon body 32 or 32a may be machined or cut therein after the body has been molded on the arcuate portion of the metal blank, or such teeth may be molded in the nylon body at the same time that the latter is molded on the metal blank.

Since the nylon body enveloping the arcuate portion of the metal blank cannot appreciably affect either the clearance between the pinion and sector gear or the accuracy with which the pinion and sector gear translate and multiply the movements of the Bourdon tube 13, or other motor element, into angular displacements of the pointer on the shaft 20, it is apparent that the present invention avoids the necessity of providing a frame which is formed of a metal having a high thermal coefficient of expansion to compensate for the changes in clearance and errors in transmission resulting from the expansion and contraction of the nylon element. Thus, the frame of the operating mechanism 10 can be formed of the usual stable materials, for example, brass, to ensure accurate indication of the sensed condition.

Further, it is apparent that the nylon body of the gear sector can be given a relatively wide face, to provide a large area of contact of its teeth with the teeth of the pinion 21, without substantially increasing the weight and inertia of the sector gear, since the major portion of the latter is formed by the thin metal blank 25 or 25a.

Since the nylon body 32 or 32a is stabilized radially and circumferentially against expansion and contraction by the arcuate portion of the metal blank on which it is molded, the pinion 21 can be formed of a hard metal having a small thermal coefficient of expansion in relation to that of nylon alone, thereby providing a desirably great dissimilarity between the hardness of the contacting surfaces of the pinion and sector gear, respectively, and ensuring the free working of the meshing teeth, even in the absence of any lubricant. It will also be noted that the present invention, in providing the nylon body 32 or 32a as part of the sector gear, conforms to the accepted practice of forming the relatively high speed gear, that is, the pinion 21, of the harder material.

Although illustrative embodiments of the invention have been described in detail herein and shown in the accompanying drawing, it is to be understood that the invention is not limited to those precise embodiments, and that various changes and modifications, including the manner of forming the nylon, may be effected therein without departing from the scope or spirit of the invention, except as defined in the appended claim.

What is claimed is:

In a mechanical movement of a dial indicating instrument for translating and multiplying the movements of a motor element into relatively large angular displacements of a pointer carrying shaft; the combination of a metal pinion gear of relatively small pitch diameter adapted to be secured on the pointer carrying shaft, a sector gear having teeth thereon with the radius of the pitch circle of said teeth being relatively large, means rockably mounting said sector gear on an axis concentric with said pitch circle and with said teeth of the sector gear meshing with the teeth of said pinion gear, and means for connecting said sector gear to the motor element so that movement of the latter causes rocking of the sector gear, said sector gear including a metal arcuate portion concentric with said rocking axis, spaced radial spokes connecting said arcuate portion to said rocking axis, said arcuate portion being formed with a series of openings therein, and a molded nylon body enveloping said arcuate portion so as to completely underlie the bottom surface of said arcuate portion between said spokes and extending through said openings in the arcuate portion, said nylon body being generally similar in shape to said arcuate portion and having said teeth of the sector gear in its radially outer edge surface so that only a small percentage of the radial distance from said rocking axis to said pitch circle is formed by the material of said nylon body thereby to minimize the variations in the clearance between said pinion and sector gears resulting from temperature changes, and said arcuate portion of the metal blank resisting circumferential expansion and contraction of the nylon body to ensure accurate transmission of the motor element movement to the pointer carrying shaft.

References Cited in the file of this patent

UNITED STATES PATENTS

| 2,317,275 | Kinzie | Apr. 20, 1943 |
| 2,541,790 | Sugden et al. | Feb. 13, 1951 |
| 2,720,119 | Sherman | Oct. 11, 1955 |

FOREIGN PATENTS

| 26,226 | Great Britain | Dec. 16, 1905 |